(12) United States Patent
Shi et al.

(10) Patent No.: US 11,976,684 B2
(45) Date of Patent: May 7, 2024

(54) FLOATING CONNECTOR AND CONNECTOR ASSEMBLY

(71) Applicant: ILLINOIS TOOL WORKS INC., Glenview, IL (US)

(72) Inventors: Jielei Shi, Shanghai (CN); Ziteng Zheng, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 543 days.

(21) Appl. No.: 17/156,005

(22) Filed: Jan. 22, 2021

(65) Prior Publication Data

US 2021/0222713 A1 Jul. 22, 2021

(30) Foreign Application Priority Data

Jan. 22, 2020 (CN) .......................... 202010074864.3
Jan. 12, 2021 (CN) .......................... 202110037619.X

(51) Int. Cl.
*F16B 5/02* (2006.01)

(52) U.S. Cl.
CPC .......... *F16B 5/0258* (2013.01); *F16B 5/0216* (2013.01)

(58) Field of Classification Search
CPC ............. Y10T 403/451; Y10T 403/453; Y10T 403/454; Y10T 403/455; F16B 5/0216; F16B 5/0258
See application file for complete search history.

(56) References Cited

U.S. PATENT DOCUMENTS

| | | | | |
|---|---|---|---|---|
| 2,555,347 A * | 6/1951 | Lee | ......................... | F16F 13/08 267/140.13 |
| 2,562,195 A * | 7/1951 | Lee | ......................... | F16F 13/24 267/140.13 |
| 2,582,998 A * | 1/1952 | Lee | ......................... | F16F 13/24 267/140.13 |
| 2,597,878 A * | 5/1952 | Lee | ......................... | F16F 13/08 267/140.3 |
| 3,762,747 A * | 10/1973 | Griffen | ................... | F16C 11/04 403/225 |
| 3,831,923 A * | 8/1974 | Meldrum | .............. | F16F 9/0481 267/293 |
| 4,984,928 A * | 1/1991 | Domer | .................... | F16F 1/387 403/228 |
| 6,402,129 B1 * | 6/2002 | Tani | ...................... | F16B 43/001 267/153 |

(Continued)

FOREIGN PATENT DOCUMENTS

WO    WO-0055522 A1 * 9/2000 ............ F16B 43/001

*Primary Examiner* — Matthew R McMahon
(74) *Attorney, Agent, or Firm* — Quarles & Brady LLP

(57) ABSTRACT

A floating connector includes a body part, an attachment plate, a first adjustment part and a second adjustment part. The body part has an upper plate, a lower plate, and a sleeve disposed between the upper plate and the lower plate. The attachment plate has a connection hole therein and is jacketed outside the sleeve through the connection hole, and the first adjustment part is integrally connected to an inner wall of the connection hole of the attachment plate. The first adjustment part is capable of providing horizontal movement of the attachment plate relative to the body part. The second adjustment part is capable of providing vertical movement of the attachment plate relative to the body part.

8 Claims, 9 Drawing Sheets

(56) References Cited

U.S. PATENT DOCUMENTS

| | | | | |
|---|---|---|---|---|
| 6,592,285 B1 * | 7/2003 | Schwarz | ................ | F16F 15/08 403/53 |
| 7,353,561 B2 * | 4/2008 | Morin | ................... | B60S 1/0488 15/250.31 |
| 8,393,601 B2 * | 3/2013 | de Mola | ............... | F16B 5/0258 267/141.5 |
| 2023/0057516 A1 * | 2/2023 | Watanabe | ............... | F01N 13/08 |

* cited by examiner

FLOATING CONNECTOR AND CONNECTOR ASSEMBLY

CROSS-REFERENCES TO RELATED APPLICATIONS

The present application is based on and claims priority to Chinese Patent Application No. 202010074864.3, filed on Jan. 22, 2020, and to Chinese Patent Application No. 202110037619.X, filed on Jan. 12, 2021. The entire disclosures of Chinese Patent Application No. 202010074864.3 and Chinese Patent Application No. 202110037619.X are incorporated herein by reference in their entirety.

STATEMENT REGARDING FEDERALLY SPONSORED RESEARCH

Not Applicable.

BACKGROUND

Floating connectors are often used in automobiles to facilitate alignment and connection of quick-connect fittings for automobile pipelines. The quick-connect fittings usually have male fittings and female fittings, and the male fitting and the female fitting are respectively mounted on two parts of the automobile. In general, the female fitting is fixed to a mounting plate where a floating connector is located. In this case, the alignment and connection of the male fitting and the female fitting can also be successfully completed even if the male fitting has a certain positional deviation relative to the female fitting in the mounting process, so that quick mounting of the automobile pipelines is realized.

BRIEF SUMMARY

The inventors have observed that even if a floating connector is employed, when mounting a male fitting to a female fitting in a matched way, the alignment and connection are often affected by the fact that deviations in the relative position of the male fitting and the female fitting in the floating connector exceeds a certain range, thereby affecting correct assembly or even resulting in assembly failure. The present disclosure provides a floating connector which has a simple structure, and does not affect the alignment and connection of the male fitting and the female fitting even if the deviations in the relative position of the male fitting and the female fitting in the floating connector are relatively large, so the assembly will not be compromised, manual intervention is not needed, and the automated assembly of the connector is facilitated.

One aspect of the present disclosure provides a floating connector, comprising a body part, an attachment plate, a first adjustment part, and a second adjustment part. The body part comprises an upper plate, a lower plate, and a sleeve disposed between the upper plate and the lower plate. The attachment plate has a connection hole therein, is jacketed outside the sleeve through the connection hole and is located between the upper plate and the lower plate of the body part, and the inner diameter of the connection hole is larger than the outer diameter of the sleeve so that an assembly space is formed between the inner diameter of the connection hole and the outer diameter of the sleeve. The first adjustment part is located in the assembly space, wherein the first adjustment part comprises an annular portion, the annular portion has an inner edge, an outer edge and a first foldable portion located between the inner edge and the outer edge, and the outer edge is connected to the inner wall of the connection hole. The second adjustment part comprises a tubular body, the tubular body being jacketed outside the sleeve and having a second foldable portion. The first adjustment part is arranged around the tubular body of the second adjustment part, and the inner edge of the first adjustment part extends from an outer wall of the tubular body and is integrated with it.

In the floating connector as described above, the first adjustment part is capable of deforming elastically through the first foldable portion, so that the first adjustment part provides horizontal movement of the attachment plate relative to the body part; and the second adjustment part is capable of deforming elastically through the second foldable portion, so that the second adjustment part provides vertical movement of the attachment plate relative to the body part.

In the floating connector as described above, the first adjustment part and the second adjustment part are integrally formed by rubber, and the attachment plate is made of plastic.

In the floating connector as described above, the attachment plate is integrally formed with the first adjustment part through over-molding process.

In the floating connector as described above, the distance between the upper plate and the lower plate of the body part is greater than the thickness of the attachment plate, such that the attachment plate is movable between the upper plate and the lower plate.

In the floating connector as described above, the lower plate of the body part is integrally formed with the sleeve, and the upper plate is fastened to the sleeve.

Another aspect of the present disclosure is to provide a connector assembly, comprising any floating connector as described above, and further comprising a fastener capable of connecting the floating connector to a first mounting piece to be fixed through the sleeve of the floating connector.

In the connector assembly as described above, the fastener comprises a shank, a head provided at one end of the shank, and a nut connected to the other end of the shank, the shank is capable of being mounted in the sleeve, and the first mounting piece to be fixed is connected between the upper plate/lower plate and the nut/head.

In the connector assembly as described above, the attachment plate of the floating connector is provided with a mounting hole for connecting a second mounting piece to be fixed.

A third aspect of the present disclosure is to provide a connector assembly, comprising a body part, an attachment plate, a fastener, a first adjustment part, and a second adjustment part. The body part comprises an upper plate, a lower plate, and a sleeve disposed between the upper plate and the lower plate. The attachment plate has a connection hole therein, is jacketed outside the sleeve through the connection hole and is located between the upper plate and the lower plate of the body part, and the inner diameter of the connection hole is larger than the outer diameter of the sleeve so that an assembly space is formed between an inner wall of the connection hole and an outer wall of the sleeve. The fastener comprises a shank, a head provided at one end of the shank, and a nut connected to the other end of the shank, the shank being mounted in the sleeve. The first adjustment part is located in the assembly space, wherein the first adjustment part comprises a tubular portion and an annular portion extending from an outer wall of the tubular portion and being integrated with the outer wall, the annular portion has an inner edge, an outer edge and a foldable portion located between the inner edge and the outer edge, the outer edge is connected to the inner wall of the connection hole, and the inner edge is connected to the outer wall of the tubular portion. The second adjustment part is a coil spring, wherein the coil spring is wound on the shank between the head and the nut of the fastener, and is located above the upper plate or below the lower plate of the body part.

In the connector assembly as described above in the third aspect, the first adjustment part is capable of deforming elastically through the foldable portion, so that the first adjustment part provides horizontal movement of the attachment plate relative to the body part; and the coil spring is capable of deforming elastically, thereby providing vertical movement of the attachment plate relative to the body part.

In the connector assembly as described above in the third aspect, the first adjustment part is formed by rubber, and the attachment plate is formed by plastic.

In the connector assembly as described above in the third aspect, the attachment plate is integrally formed with the first adjustment part through over-molding process.

In the connector assembly as described above in the third aspect, the attachment plate is clamped between the upper plate and the lower plate of the body part to restrict the attachment plate to move between the upper plate and the lower plate.

In the connector assembly as described above in the third aspect, the upper plate of the body part is integrally formed with the sleeve, and the lower plate is fastened to the sleeve.

In the connector assembly as described above in the third aspect, the first mounting piece to be fixed is connected between the upper plate/lower plate and the nut/head.

In the connector assembly as described above in the third aspect, the attachment plate of the connector is provided with a mounting hole for connecting a second mounting piece to be fixed.

According to the floating connector of the present disclosure, floating with a controllable floating amount can be realized in three directions XYZ through a simple structure, such that the precision requirements for mounting positions of parts during mounting are reduced, and the automated assembly is also facilitated.

DETAILED DESCRIPTION

Figure 1:
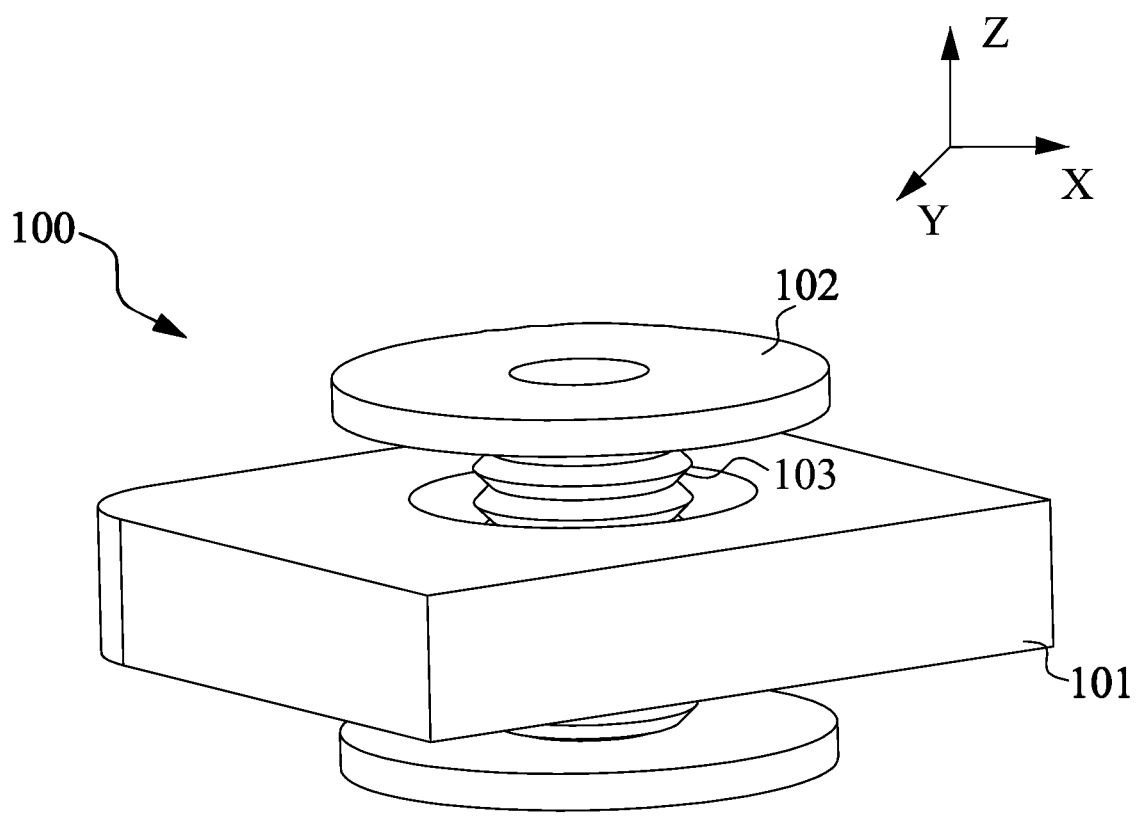
FIG. 1 shows a three-dimensional structure of a floating connector 100 of a first embodiment of the present disclosure.

Various specific embodiments of the present disclosure are described below with reference to the accompanying drawings which constitute part of this description. It should be understood that although the terms such as "front", "rear", "upper", "lower", "left", and "right" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations. If possible, the same or similar reference numerals used in the present disclosure refer to the same components.

FIG. 1 shows a three-dimensional structure of a floating connector 100 of an embodiment of the present disclosure. As shown in FIG. 1, the floating connector 100 comprises an attachment plate 101, a body part 102, and an adjustment part 103. The attachment plate 101 is connected to the adjustment part 103, and the adjustment part 103 is connected to the body part 102. The attachment plate 101 extends on a plane defined by an X axis and a Y axis, and the adjustment part 103 is arranged such that the attachment plate 101 can float in the plane defined by the X axis and the Y axis, and can float in a Z-axis direction perpendicular to the plane defined by the X axis and Y axis. The substantially rectangular shape of the attachment plate 101 shown in FIG. 1 is only for illustration. In fact, the shape and size of the attachment plate 101 can be adjusted according to the application environment of the floating connector 100.

Figure 2:
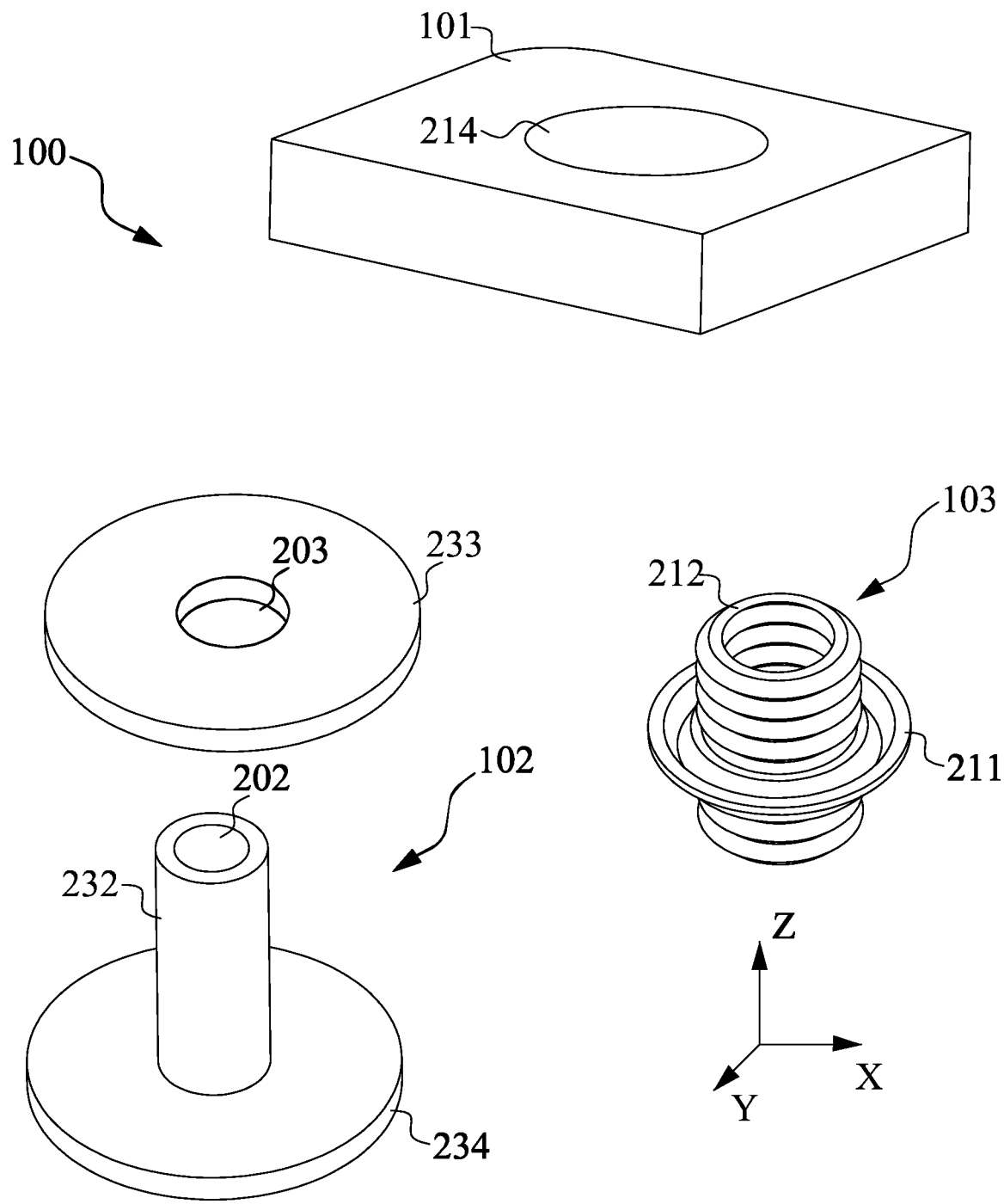
FIG. 2 is an exploded view of the floating connector 100 shown in FIG. 1.

FIG. 2 is an exploded view of the floating connector 100 shown in FIG. 1. It should be noted that, as an embodiment, the attachment plate 101 and the adjustment part 103 may be integrally formed, but for ease of understanding, the present disclosure illustrates the attachment plate 101 and the adjustment part 103 as separated parts. As shown in FIG. 2, the attachment plate 101 is in the shape of a flat plate, in which a connection hole 214 is provided. The connection hole 214 has a circular cross-section. The connection hole 214 runs through the entire attachment plate 101 in the thickness direction for at least partially accommodating the body part 102 and the adjustment part 103. The adjustment part 103 comprises a first adjustment part 211 and a second adjustment part 212, and as an embodiment, the first adjustment part 211 and the second adjustment part 212 are integrally formed. The second adjustment part 212 is substantially tubular and generally extends in a vertical direction; and the first adjustment part 211 is substantially annular and generally extends in a horizontal direction. As shown in FIG. 2, the first adjustment part 211 is arranged circumferentially around an outer surface of the second adjustment part 212, and the first adjustment part 211 extends from an outer wall of the second adjustment part 212 and is integrated with it. An outer edge of the first adjustment part 211 has a circular shape and is sized to match the size of the cross-section of the connection hole 214 of the attachment plate 101, so that the first adjustment part 211 can be connected to an inner wall of the connection hole 214 of the attachment plate 101. In this embodiment, the adjustment part 103 is formed by rubber, and the attachment plate 101 is formed by plastic, so that the attachment plate 101 can be integrally formed with the adjustment part 103 through over-molding process. The rubber material itself makes the adjustment part 103 have elasticity and elastically deformable, but in order to increase the floating amount of the floating connector 100, the adjustment part 103 of the present disclosure further comprises a foldable portion. By means of the foldable structure of the foldable portion, the adjustment part 103 formed by the rubber is easier to stretch and compress, that is, more easily deformed elastically.

Figure 3:
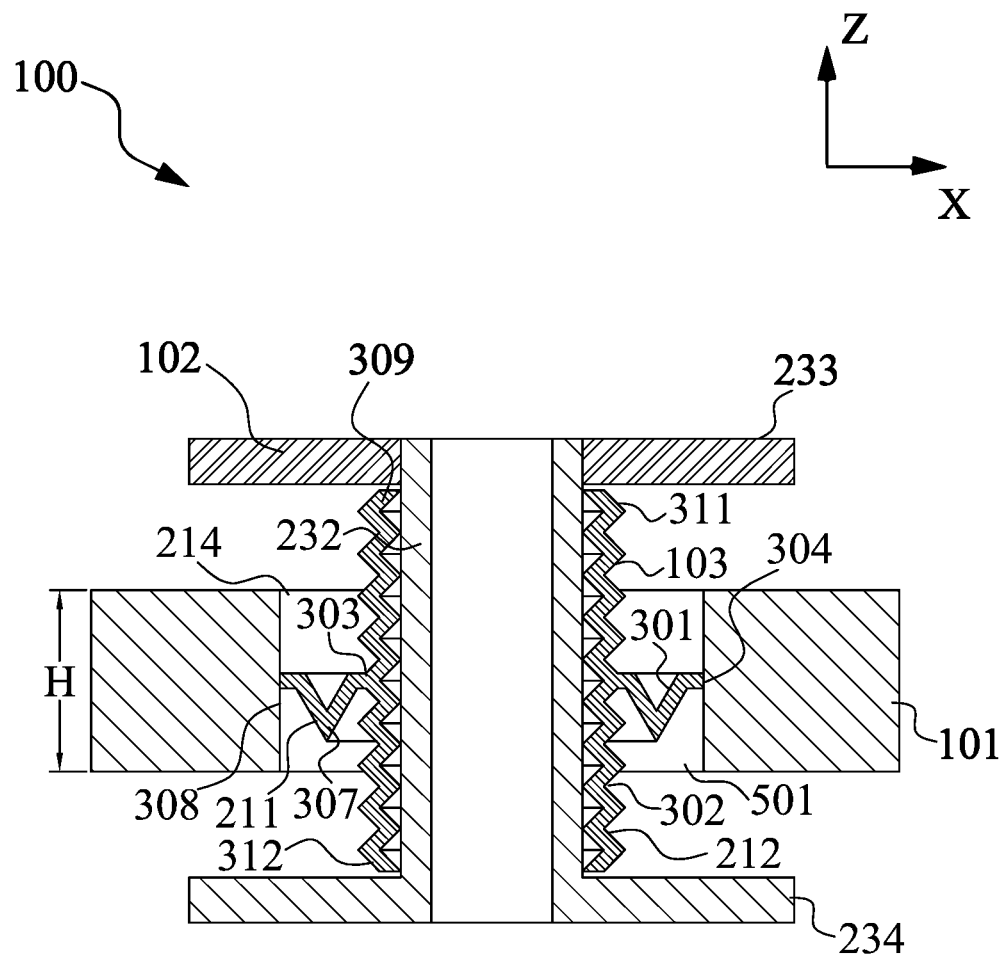
FIG. 3 is an axial cross-sectional view of the floating connector 100 shown in FIG. 1.

Referring to FIG. 3, the first adjustment part 211 comprises an annular portion 307, and the annular portion 307 is provided with a first foldable portion 301. The foldable structure of the first foldable portion 301 extends in the horizontal direction so that the first foldable portion 301 can provide elastic deformation in the horizontal direction. The second adjustment part 212 comprises a tubular body 309. The tubular body 309 is provided with a second foldable portion 302, and the foldable structure of the second foldable portion 302 foldably extends substantially in the vertical direction so that the second foldable portion 302 can provide elastic deformation in the vertical direction. The second adjustment part 212 vertically extends along the Z-axis direction, and the first adjustment part 211 horizontally extends substantially in the plane defined by the X axis and the Y axis. That is, the first adjustment part 211 can provide elastic deformation in the plane defined by the X axis and the Y axis, and the second adjustment part 212 can provide elastic deformation in the Z-axis direction.

As shown in FIG. 2, the body part 102 comprises an upper plate 233, a lower plate 234 and a sleeve 232, and the sleeve 232 is connected between the upper plate 233 and the lower plate 234. In this embodiment, the lower plate 234 is integrally formed with the sleeve 232, the upper plate 233 is disposed separately from the sleeve 232, and the upper plate 233 and the sleeve 232 are fastened together in an interference fit manner. The sleeve 232 is cylinder-shaped and has a through hole 202 therein, and the through hole 202 runs through the lower plate 234. The upper plate 233 and the lower plate 234 are both in the shape of a circular plate, and the center of the upper plate 233 is provided with a circular hole 203. The inner diameter of the circular hole 203 is slightly smaller than the outer diameter of the sleeve 232, so that the sleeve 232 can be fixedly engaged with the upper plate 233 in an interference fit manner. When the sleeve 232 is engaged with the upper plate 233, the through hole 202 inside the sleeve 232 can also make the upper plate 233 have perforative structure, thereby making the entire body part 102 have perforative structure. As shown in FIG. 2, the the through hole 202 of sleeve 232 runs through the upper plate 233 and the lower plate 234 at the centers of the upper plate 233 and the lower plate 234, respectively.

In this embodiment, the sleeve 232 and the upper plate 233 are connected together in an interference fit manner, and in other embodiments, the upper plate 233 and the sleeve 232 may also be fastened together in other manners such as threaded connection. In this embodiment, the upper plate 233 is disposed separately from the sleeve 232, and the lower plate 234 is integrally formed with the sleeve 232. In other embodiments, the lower plate 234 may be disposed separately from the sleeve 232, and the upper plate 233 may be integrally formed with the sleeve 232. Alternatively, the upper plate 233 and the lower plate 234 are both disposed separately from the sleeve 232.

FIG. 3 is an axial cross-sectional view of the floating connector 100 shown in FIG. 1 for showing the connection relationship between the attachment plate 101, the body part 102, and the adjustment part 103. As shown in FIG. 3, the distance between the upper plate 233 and the lower plate 234 of the body part 102 is greater than the thickness of the attachment plate 101, the sleeve 232 of the body part 102 is disposed in the connection hole 214 of the attachment plate 101, and the upper plate 233 and the lower plate 234 are respectively located on the upper and lower sides of the attachment plate 101, such that the attachment plate 101 can move between the upper plate 233 and the lower plate 234. The inner diameter of the connection hole 214 is larger than the outer diameter of the sleeve 232 so that an assembly space 501 can be formed between the inner wall of the connection hole 214 and an outer wall of the sleeve 232, and the assembly space 501 can be used for assembling the adjustment part 103.

As shown in FIG. 3, the second adjustment part 212 is jacketed outside the sleeve 232, and the inner diameter of a tube of the second adjustment part 212 is approximately the same as the outer diameter of the sleeve 232, so that an inner wall of the second adjustment part 212 is fitted to the outer wall of the sleeve 232. The tube of the second adjustment part 212 extends in an axial direction of the sleeve 232 to form an upper end portion and a lower end portion, namely an upper end portion 311 and a lower end portion 312, respectively. The axial height of the second adjustment part 212 is approximately the same as a distance between the upper plate and the lower plate of the body part 102, so that the second adjustment part 212 is jacketed outside the sleeve 232 between the upper plate 233 and the lower plate 234 of the body part 102 exactly. The structural design of the upper plate 233 and the lower plate 234 in the body part 102 can effectively limit the elastic deformation of the second adjustment part 212 in the Z-axis direction, that is, limiting the floating of the floating connector 100 in the Z-axis direction. In this embodiment, there is a small interval between the upper end portion 311 of the second adjustment part 212 and the upper plate 233, and there is a small interval between the lower end portion 312 of the second adjustment part 212 and the lower plate 234. Such an arrangement enables the second adjustment part 212 to obtain a larger elastic deformation space in the Z-axis direction, thereby increasing the floating amount of the floating connector 100 in the Z-axis direction to some extent. In other embodiments, the axial height of the second adjustment part 212 may also be set such that the upper end portion 311 of the second adjustment part 212 is exactly abutted the upper plate 233, and the lower end portion 312 of the second adjustment part 212 is exactly abutted the lower plate 234. By means of such an arrangement, the floating amount of the floating connector 100 in the Z-axis direction is reduced to some extent, but the fact is avoided that the second adjustment part 212 collides with the upper plate 233 or the lower plate 234 during transportation, thereby preventing the floating connector 100 from being damaged due to transportation.

As shown in FIG. 3, the first adjustment part 211 is disposed at an axial middle position of the second adjustment part 212 and is integrally connected to the second adjustment part 212. The annular portion 307 of the first adjustment part 211 has an inner edge 303 and an outer edge 304, and the first foldable portion 301 is located between the inner edge 303 and the outer edge 304. The inner edge 303 of the annular portion 307 is connected to the outer wall of the second adjustment part 212, and the outer edge 304 of the annular portion 307 is connected to the inner wall 308 of the connection hole 214.

In this embodiment, the first foldable portion 301 and the second foldable portion 302 are both of undulating foldable structures, thereby facilitating elastic deformation of the adjustment part 103 in the three directions XYZ. In other embodiments, it is also possible to configure only a partial structure of the first adjustment part 211 to have the first foldable portion 301, or to configure only a partial structure of the second adjustment part 212 to have the second foldable portion 302, as long as the first adjustment part 211 and the second adjustment part 212 are capable of achieving appropriate elastic deformation in the three directions XYZ.

The attachment plate 101 has a certain thickness H, the first adjustment part 211 is connected to the inner wall of the connection hole 214 of the attachment plate 101, and a connection point of the first adjustment part 211 to the attachment plate 101 is located at the middle position in the direction of the thickness H of the attachment plate 101. Since the attachment plate 101 is integrally connected to the first adjustment part 211 and the first adjustment part 211 is integrally connected to the second adjustment part 212, the elastic deformation of the first adjustment part 211 in the X-axis and Y-axis directions can drive the attachment plate 101 to move in the X-axis and Y-axis directions, and the elastic deformation of the second adjustment part 212 in the Z-axis direction can drive the attachment plate 101 to move in the Z-axis direction. The movement ranges of the attachment plate 101 in the X-axis and Y-axis directions are consistent with the amounts of elastic deformation of the first adjustment part 211 in the X-axis and Y-axis directions, and the movement range of the attachment plate 101 in the Z-axis direction is consistent with the amount of elastic deformation of the second adjustment part 212 in the Z-axis direction. That is, the first adjustment part 211 and the second adjustment part 212 can provide displacement floating in the three directions XYZ for the attachment plate 101.

The floating connector 100 of the present disclosure has a simple structure, the adjustment part 103 is prepared by using the rubber material, and the controllable floating amounts of the floating connector 100 in the three directions XYZ are realized by utilizing the stretching and compression properties of the rubber material itself. In addition, the floating connector 100 of the present disclosure needs a smaller number of parts to be assembled, thereby facilitating automated assembly. For the assembly comprising the attachment plate 101 and the adjustment part 103 formed integrally, the assembly comprising the lower plate 234 and sleeve 232 formed integrally are mounted from below the adjustment part 103 such that the sleeve 232 is nested inside the tube of the second adjustment part 212, and the lower plate 234 is located under the second adjustment part 212. In this case, the top of the sleeve 232 extends upwardly out of the second adjustment part 212, and the circular hole 203 of the upper plate 233 is aligned with the top of the sleeve 232 for mounting, such that the floating connector 100 can be assembled by connecting the upper plate 233 to the sleeve 232 in an interference fit manner.

Figure 4:
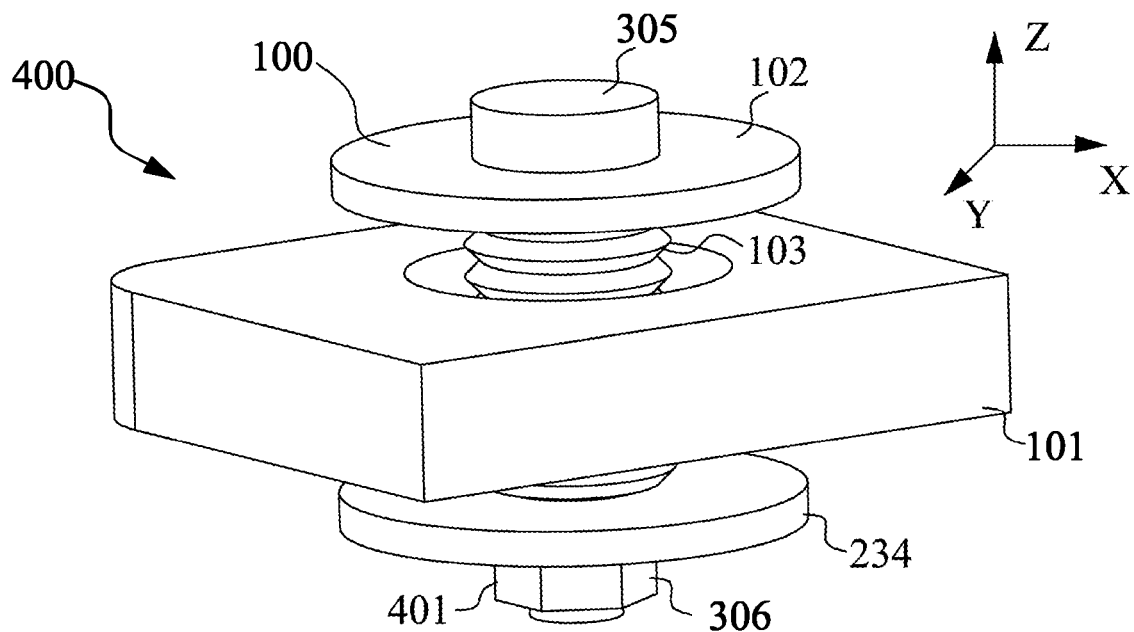
FIG. 4 shows a connector assembly 400 of a first embodiment of the present disclosure.
Figure 5:
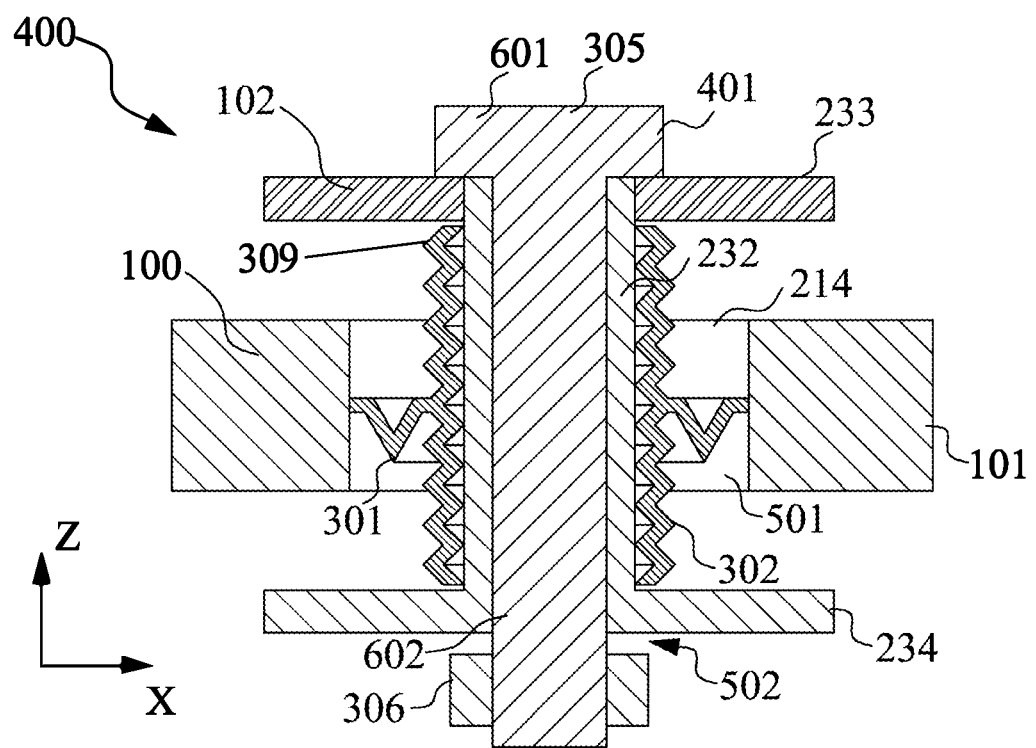
FIG. 5 is an axial cross-sectional view of the connector assembly 400 shown in FIG. 4.
Figure 6:
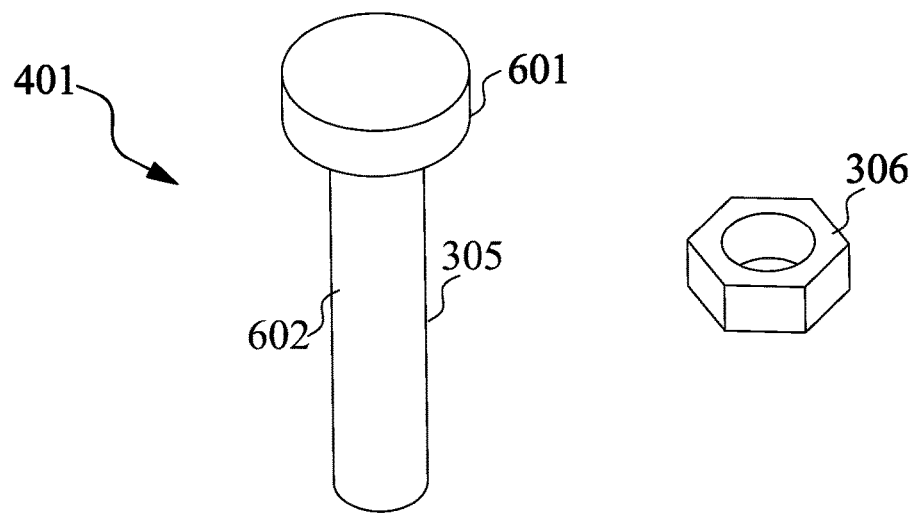
FIG. 6 shows a three-dimensional structure of the fastener 401 shown in FIG. 4.

FIG. 4 shows a connector assembly 400 of a first embodiment of the present disclosure, showing a cooperating relationship between the floating connector 100 shown in FIG. 1 and a fastener 401; FIG. 5 is an axial cross-sectional view of the connector assembly 400 shown in FIG. 4; and FIG. 6 shows a three-dimensional structure of the fastener 401 shown in FIG. 4. As shown in FIGS. 4 to 6, the floating connector 100 can be used in cooperation with the fastener 401 to form a connector assembly 400. In this embodiment, the fastener 401 comprises a bolt 305 and a nut 306. As shown in FIG. 6, the bolt 305 comprises a head 601 and a shank 602. The shank 602 of the bolt 305 is provided with an external thread (not shown), the interior of the nut 306 is provided with an internal thread (not shown), and the external thread and the internal thread cooperate to enable the nut 306 to be fixed to the bolt 305.

As shown in FIGS. 4 and 5, when the bolt 305 and the nut 306 are mounted on the floating connector 100 in a cooperating manner, the shank 602 of the bolt 305 is inserted into the interior of the sleeve 232, and the head 601 of the bolt 305 remains above the upper plate 233. A distal end of the shank 602 of the bolt 305 extends out of a lower surface of the lower plate 234 by a length, and a certain accommodating space 502 can also be reserved between the nut 306 and the lower plate 234 even if the nut 306 is completely assembled to the distal end of the shank 602 of the bolt 305. The accommodating space 502 between the nut 306 and the lower plate 234 can be used to accommodate a first mounting piece to be fixed. For simplicity of illustration, the first mounting piece is not shown in FIGS. 4 and 5. The first mounting piece is provided with an insertion hole through which the shank 602 of the bolt 305 can pass, so that the first mounting piece is fixed between the lower plate 234 of the floating connector 100 and the nut 306 of the fastener 401. That is, the fastener 401 is capable of connecting the floating connector 100 to the first mounting piece to be fixed. In this embodiment, the first mounting piece to be fixed is a fixed mounting plate on an automobile, so that the floating connector 100 can provide a three-way floating mounting structure for components and parts on the automobile.

When the floating connector 100 is connected to the first mounting piece to be fixed by using the bolt 305 and the nut 306, the shank 602 of the bolt 305 may be firstly inserted into the sleeve 232 from above the floating connector 100 while the head 601 of the bolt 305 remains above the upper plate 233. The floating connector 100 with the bolt 305 mounted thereon is then fixed to an upper surface of the first mounting piece to be fixed, namely, the fixed mounting plate of the automobile. The distal end of the shank 602 of the bolt 305 passes through the insertion hole in the first mounting piece and extends out of a lower surface of the first mounting piece. Finally, the floating connector 100 can be connected to the first mounting piece by mounting the nut 306 to the distal end of the shank 602 of the bolt 305 from lower side of the first mounting piece and screwing the nut 306 upwardly until an upper surface of the nut 306 abuts against the lower surface of the first mounting piece.

In the first embodiment of the present disclosure, the first mounting piece is fixed between the lower plate 234 of the body part 102 and the nut 306 of the fastener 401. In other embodiments, the first mounting piece may also be connected between the upper plate 233 of the body part 102 and the head 601 of the bolt 305.

Figure 7:
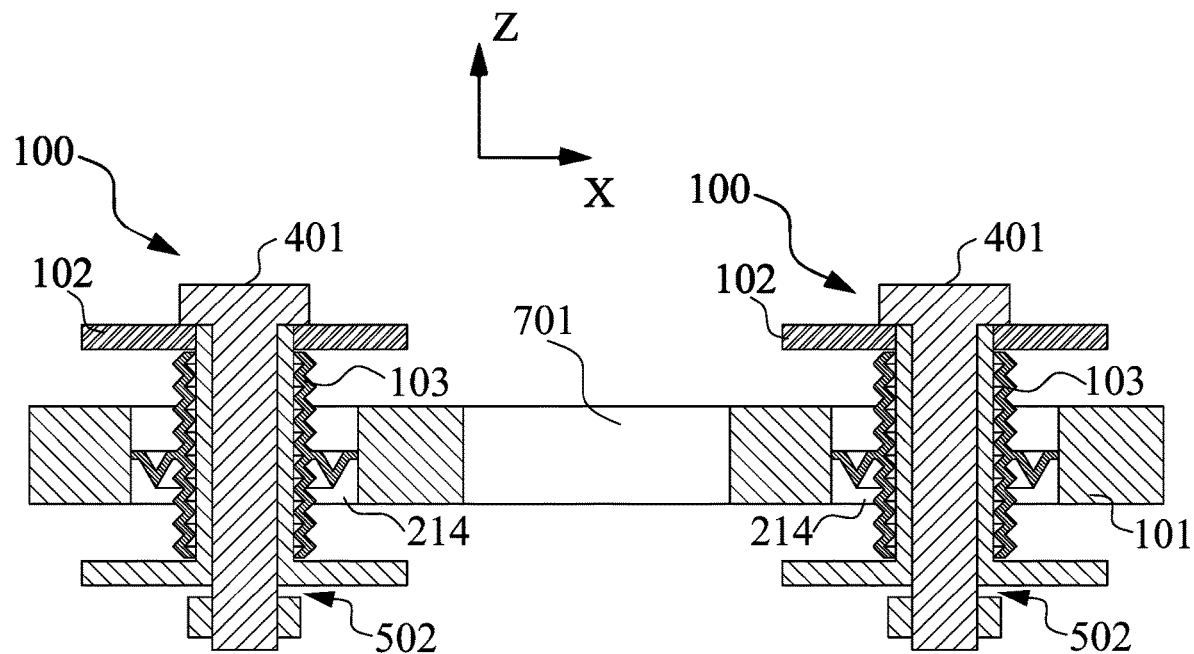
FIG. 7 shows a schematic view of two floating connectors 100 in cooperative use.

FIG. 7 shows a schematic view of two floating connectors 100 in cooperative use, and the unique structural arrangement thereof enables the two floating connectors 100 to be connected to the same first mounting piece to be fixed. The two floating connectors 100 shown in FIG. 7 have the same structures as the floating connectors 100 shown in FIGS. 1 to 3 of the present disclosure. It is noteworthy that the two floating connectors 100 in FIG. 7 comprise two body parts 102 and two adjustment parts 103, but share the same attachment plate 101. That is, the attachment plate 101 in FIG. 7 is provided with two connection holes 214, one adjustment part 103 is integrally formed on the inner wall of each connection hole 214 of the two connection holes 214, and the two adjustment parts 103 can provide floating adjustments in the three directions XYZ for the same attachment plate 101. In order to adapt the two floating connectors 100 to make them connect and mount to the first mounting piece to be fixed, the two floating connectors 100 need to be provided with two fasteners 401, and the first mounting piece to be fixed may be provided with two insertion holes having structures corresponding to those of the two fasteners 401, so that the two fasteners 401 can respectively fix the two floating connectors 100 to the first mounting piece through the two insertion holes. The cooperative use of the two floating connectors 100 ensures both the stability of the floating adjustment of the attachment plate 101 and the secured mounting of the floating connectors 100 on the first mounting piece.

As shown in FIG. 7, the attachment plate 101 is further provided with a mounting hole 701 for connecting a second mounting piece (not shown) to be fixed. In order to ensure a stable mounting structure of the second mounting piece, the mounting hole 701 is located at the middle position between the two floating connectors 100. When the second mounting piece to be fixed is mounted in the mounting hole 701, the second mounting piece can float in the three directions XYZ along with the attachment plate 101. That is, the second mounting piece is capable of achieving floating displacement within a certain range in the three directions XYZ relative to the first mounting piece. In this embodiment, the second mounting piece is a female fitting of quick-connect fittings for an automobile pipeline. According to the arrangement, the female fitting of the quick-connect fittings for the automobile pipeline can float in the three directions XYZ relative to the fixed mounting plate of the automobile, so that a male fitting and the female fitting can also be quickly and effectively connected together even if the male fitting has a certain positional deviation relative to the female fitting in the process of inserting the male fitting into the female fitting.

The present disclosure provides a floating connector which has a simple structure, and does not affect the alignment and connection of the male fitting and the female fitting even if the deviations in the relative position of the male fitting and the female fitting in the floating connector are relatively large, so that the assembly cannot be affected, manual intervention is not needed, and the automated assembly of the connector is therefore facilitated.

According to the floating connector 100 of the present disclosure, the three-way floating structure with a controllable floating amount is realized by utilizing the elasticity of the rubber material, the floating connector has a simple structure, so that steps for mounting parts of the floating connector 100 are simplified, the positional precision requirements for the male fitting and the female fitting of the quick-connect fittings for the automobile pipeline are reduced, assembly failure caused by unmatched assembly positions of the parts is avoided during the assembly of the parts, and the automated assembly is also facilitated.

In the embodiment of the present disclosure, the first adjustment part 211 and the second adjustment part 212 provide elastic deformation for the adjustment part 103 through the foldable portions. In other embodiments, the first adjustment portion 211 and the second adjustment part 212 may also provide elastic deformation by other structures. In this embodiment, the fastener 401 comprises the bolt 305 and the nut 306, and a fastener 401 in another form may also be used in other embodiments.

Figure 8:
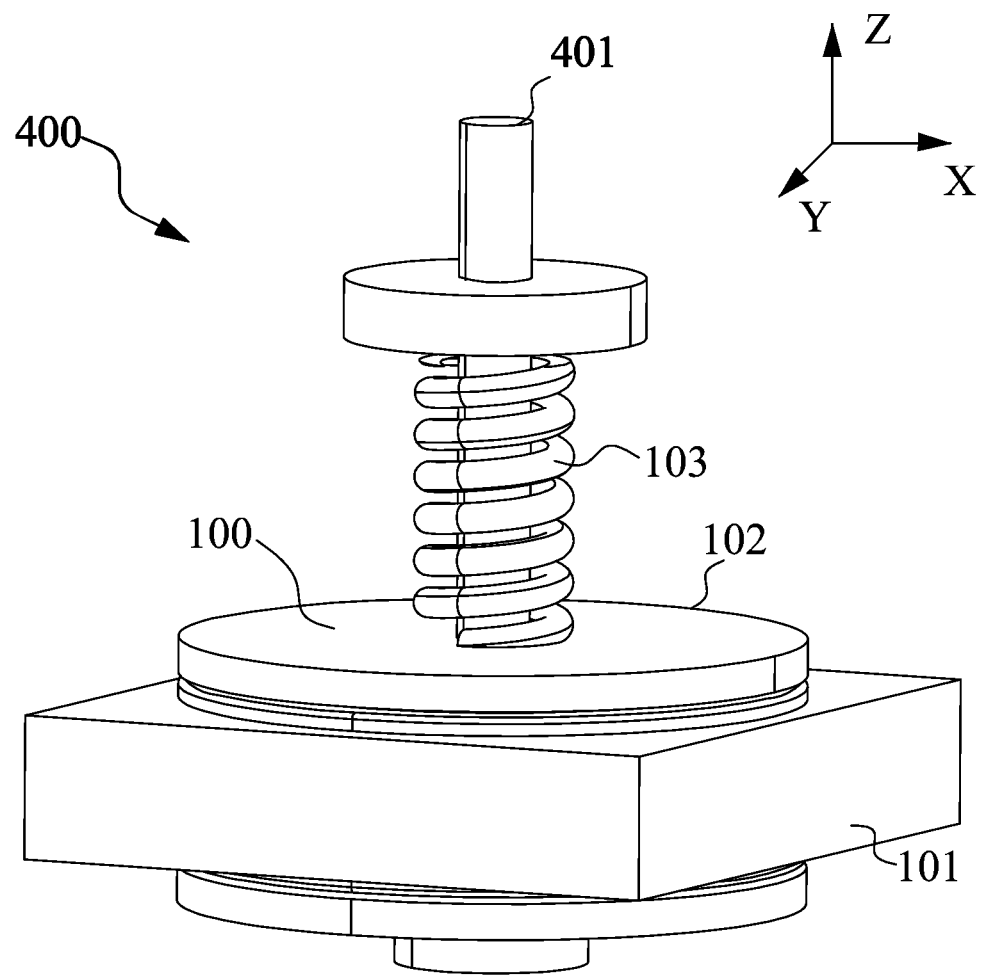
FIG. 8 shows a three-dimensional structure of a connector assembly 400 of a second embodiment of the present disclosure.

FIG. 8 shows a three-dimensional structure of a connector assembly 400 of a second embodiment of the present disclosure. As shown in FIG. 8, the connector assembly 400 of the second embodiment comprises a floating connector 100 and a fastener 401. The floating connector 100 comprises a body part 102, an attachment plate 101 and an adjustment part 103. Similar to the structure and function of the floating connector 100 of the first embodiment, in the floating connector 100 of the second embodiment, the attachment plate 101 extends on a plane defined by an X axis and a Y axis, and the adjustment part 103 is arranged such that the attachment plate 101 can float in the plane defined by the X axis and the Y axis, and can float in a Z-axis direction perpendicular to the plane defined by the X axis and Y axis.

Figure 9:
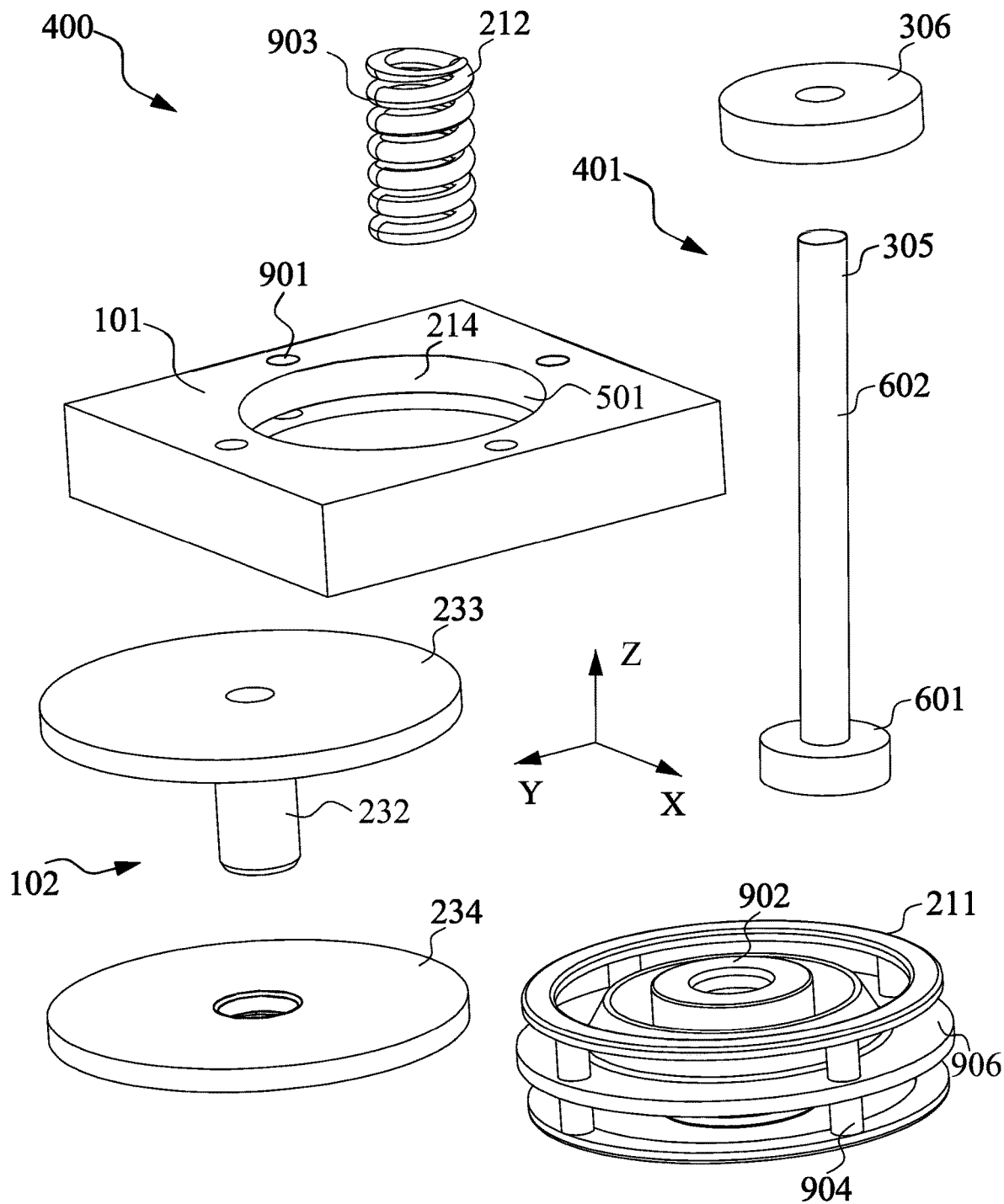
FIG. 9 shows an exploded view of the connector assembly 400 shown in FIG. 8.

FIG. 9 shows an exploded view of the connector assembly 400 shown in FIG. 8. As shown in FIG. 9, the structure of the fastener 401 of the second embodiment of the present disclosure is similar to the structure of the fastener 401 of the first embodiment, comprising a bolt 305 and a nut 306, wherein the bolt 305 comprises a head 601 and a shank 602, and the nut 306 can be fastened to the shank 602 of the bolt 305.

The structure of the body part 102 in the second embodiment is substantially the same as the structure of the body part 102 in the first embodiment, comprising an upper plate 233, a lower plate 234 and a sleeve 232, the sleeve 232 being connected between the upper plate 233 and the lower plate 234, the description of which is not repeated here. The differences lie in that unlike the structure of the first embodiment in which the upper plate 233 is disposed separately from the sleeve 232 and the lower plate 234 is integrally formed with the sleeve 232 in the body part 102, in the body part 102 of the second embodiment of the present disclosure, the upper plate 233 is integrally formed with the sleeve 232, the lower plate 234 is disposed separately from the sleeve 232, and the lower plate 234 and the sleeve 232 can be fastened together in an interference fit manner.

The attachment plate 101 is in the shape of a flat plate, in which a connection hole 214 is provided. The connection hole 214 has a circular cross-section. The connection hole 214 penetrates the entire attachment plate 101 in the thickness direction. The attachment plate 101 is further provided with a plurality of injection molding holes 901, and the plurality of injection molding holes 901 are evenly provided at intervals around an outer periphery of the connection hole 214. Each injection molding hole 901 is a small cylindrical hole extending in the thickness direction of the attachment plate 101 and penetrating the attachment plate 101 in the thickness direction thereof. The plurality of injection molding holes 901 and the connection hole 214 form an assembly space 501 together. In the second embodiment of the present disclosure, the attachment plate 101 is formed by plastic, and four injection molding holes 901 are provided around the outer periphery of the connection hole 214. In other embodiments, another material may be used to prepare the attachment plate 101, and different number of injection molding holes 901 may be provided.

The adjustment part 103 comprises a first adjustment part 211 and a second adjustment part 212. In the second embodiment of the present disclosure, the first adjustment part 211 is formed by a rubber material, and the second adjustment part 212 is formed by a metal material. The first adjustment part 211 comprises a tubular portion 902, an annular portion 307, and an injection molding portion 904, wherein the tubular portion 902, the annular portion 307 and the injection molding portion 904 are integrally formed. The first adjustment part 211 can be elastically deformed in the plane defined by the X axis and the Y axis, which helps the attachment plate 101 to float in the plane defined by the X axis and the Y axis. The second adjustment part 212 is a coil spring 903. The coil spring 903 is substantially in the shape of a cylindrical tube and extends spirally in the Z-axis direction. The coil spring 903 can be elastically deformed in the Z-axis direction, which helps the attachment plate 101 to float in the Z-axis direction.

Figure 10A:
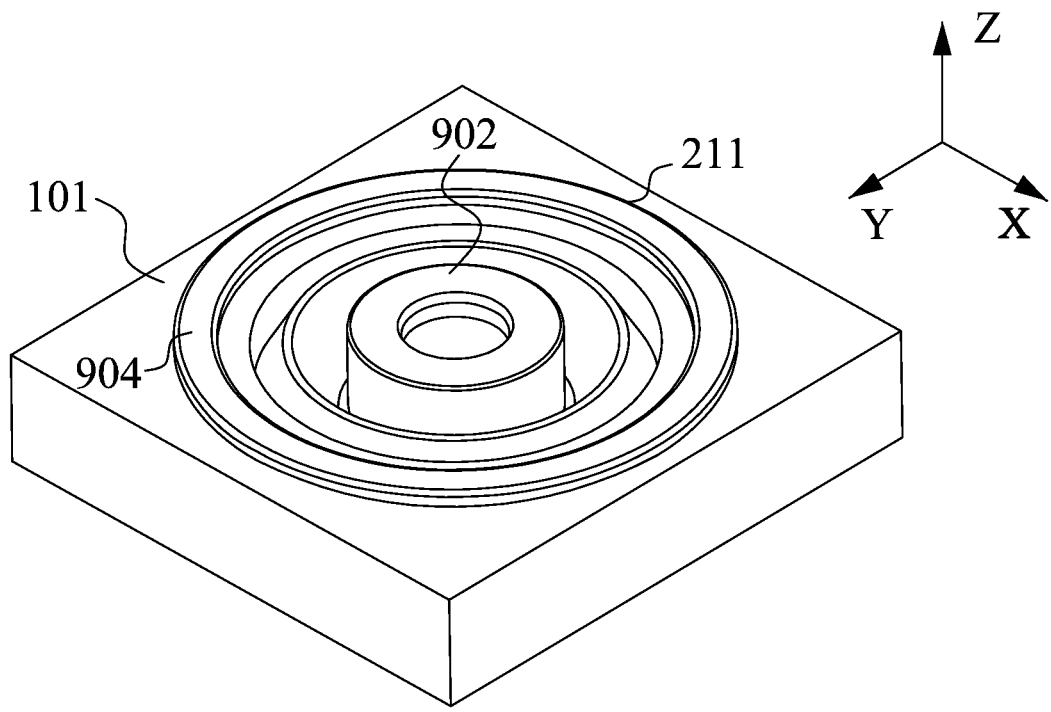
FIGS. 10A to 10C show a cooperating relationship between the first adjustment part 211 and the attachment plate 101 in FIG. 9.
Figure 10B:
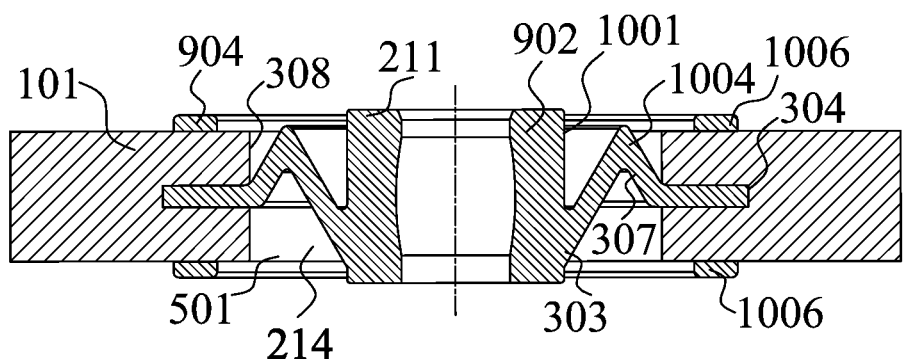
Figure 10C:
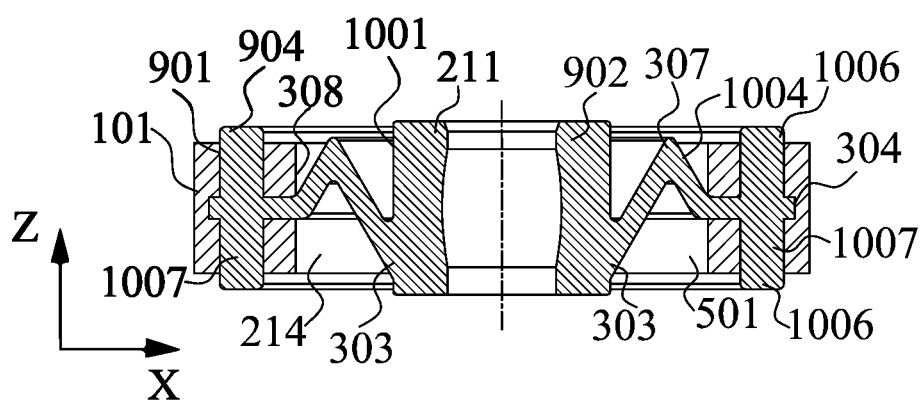

FIGS. 10A to 10C show a cooperating relationship between the first adjustment part 211 and the attachment plate 101 in FIG. 9. FIG. 10A shows a three-dimensional structure of the first adjustment part 211 and the attachment plate 101 in cooperative connection, and FIGS. 10B and 10C show longitudinal cross-sectional views the assembly of the first adjustment part 211 and the attachment plate 101 in cooperative connection in different positions, wherein FIG. 10C is a cross-sectional view in a plane defined by the X axis and the Z axis. As shown in FIGS. 10A, 10B, and 10C, the first adjustment part 211 is mounted in the assembly space 501 of the attachment plate 101, and is connected together with the attachment plate 101 through an over-molding process. The tubular portion 902 of the first adjustment part 211 is substantially in the shape of a cylindrical tube and extends in the Z-axis direction. The annular portion 307 extends from an outer wall 1001 of the tubular portion 902 and is integrated with it. The annular portion 307 has an inner edge 303 and an outer edge 304, the inner edge 303 is connected to the outer wall 1001 of the tubular portion 902, and the outer edge 304 is connected to an inner wall 308 of the connection hole 214 of the attachment plate 101. In the second embodiment of the present disclosure, the outer edge 304 of the annular portion 307 is completely embedded in the attachment plate 101. The arrangement of the tubular portion 902 helps to relatively fix a section of the annular portion 307 on the inner edge 303 side. The annular portion 307 is provided with a foldable portion 1004 between the inner edge 303 and the outer edge 304. As shown in FIGS. 10B and 10C, the longitudinal cross-section of the foldable portion 1004 is substantially "V"-shaped. The "V"-shaped structure is arranged such that the foldable portion 1004 can perform elastic movements of stretching and compression in the plane defined by the X axis and the Y axis.

The injection molding portion 904 comprises two annular injection molding portions 1006 and a plurality of columnar injection molding portions 1007. FIG. 10C shows a longitudinal cross-sectional view through two of the columnar injection molding portions 1007. With reference to FIGS. 9, 10A, 10B and 10C, it can be seen that the two annular injection molding portions 1006 are of the same size and shape, respectively in the shape of a circular ring, respectively extend in the plane defined by the X axis and the Y axis, and are arranged around the outer periphery of the tubular portion 902. The position of one of the annular injection molding portions 1006 is substantially flush with the top position of the tubular portion 902, and the position of the other annular injection molding portion 1006 is substantially flush with the bottom position of the tubular portion 902. The plurality of columnar injection molding portions 1007 are disposed between the two annular injection molding portions 1006, and each columnar injection molding portion 1007 extends in the Z-axis direction. The annular portion 307 is disposed between the two annular injection molding portions 1006 and is connected to the plurality of columnar injection molding portions 1007. The plurality of columnar injection molding portions 1007 are arranged at intervals at the position of the outer edge 304 of the annular portion 307.

The arrangement of the structure of the injection molding portion 904 helps to realize the injection-molded connection between the first adjustment part 211 and the attachment plate 101. FIGS. 10A, 10B, and 10C show the structure where the first adjustment part 211 is mounted on the attachment plate 101 in injection-molded way. As shown in FIGS. 10A, 10B and 10C, the two annular injection molding portions 1006 are respectively provided on upper and lower surfaces of the attachment plate 101, and the columnar injection molding portions 1007 are correspondingly provided in the injection molding holes 901 of the attachment plate 101. Corresponding to the four injection molding holes 901 of the attachment plate 101 in the second embodiment, the first adjustment part 211 is provided with four columnar injection molding portions 1007 in the injection molding portion 904, wherein the four columnar injection molding portions 1007 of the first adjustment part 211 are disposed in the four injection molding holes 901 of the attachment plate 101 in one-to-one correspondence. The structural arrangement in which the first adjustment part 211 and the attachment plate 101 are integrally connected through an injection molding process effectively reduces the number of parts of the connector assembly 400 of the second embodiment, and simplifies the installation steps of the connector assembly 400 of the second embodiment.

Figure 11A:
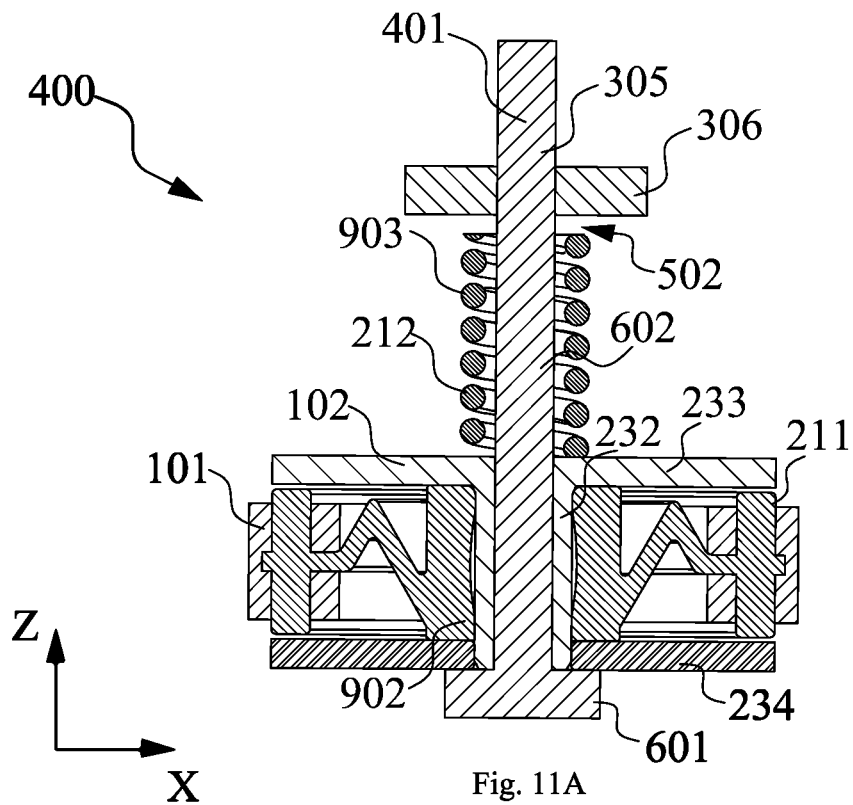
FIGS. 11A and 11B show longitudinal cross-sectional views of the connector assembly 400 in FIG. 8 at different positions.
Figure 11B:
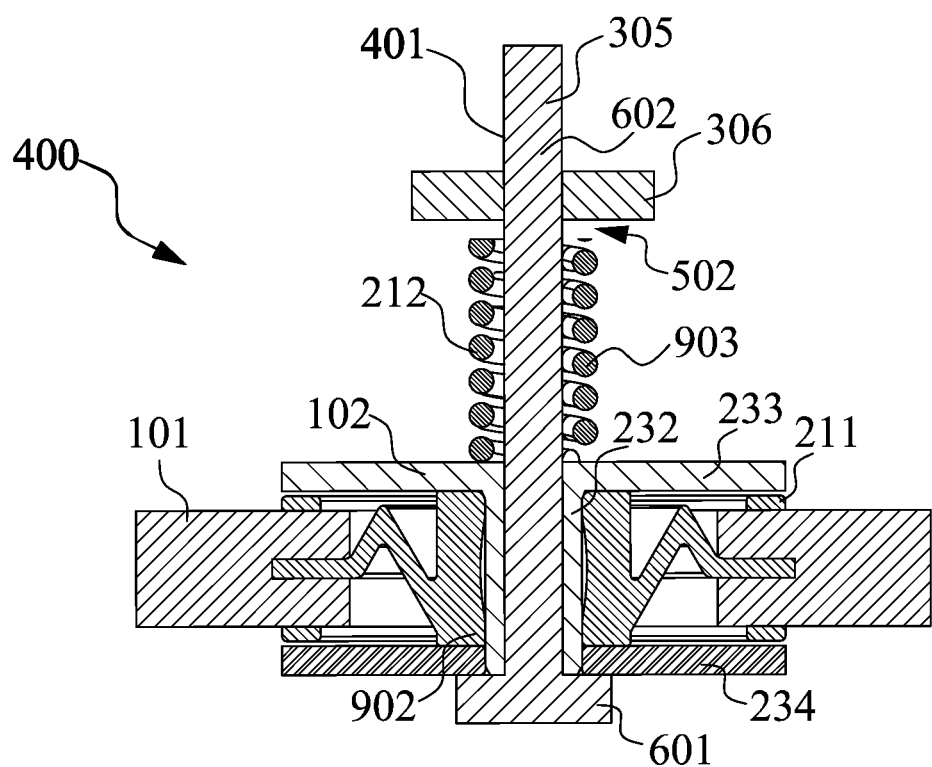

FIGS. 11A and 11B show longitudinal cross-sectional views of the connector assembly 400 in FIG. 8 at different positions, wherein FIG. 11A shows a longitudinal cross-sectional view of the connector assembly 400 of the second embodiment at the longitudinal cross-sectional position shown in FIG. 10C, and FIG. 11B shows a longitudinal cross-sectional view of the connector assembly 400 of the second embodiment at the longitudinal cross-sectional position shown in FIG. 10B. As shown in FIGS. 11A and 11B, the inner diameter of the tubular portion 902 of the first adjustment part 211 is larger than the outer diameter of the sleeve 232, and the sleeve 232 of the body part 102 is coaxially arranged on the inner side of the tubular portion 902 of the first adjustment part 211. The upper plate 233 and the lower plate 234 of the body part 102 are respectively located on the upper and lower sides of the first adjustment part 211, so that the first adjustment part 211 is generally limited within the coverage range of the body part 102. Moreover, the attachment plate 101 in injection-molded connection with the first adjustment part 211 is also clamped between the upper plate 233 and the lower plate 234 of the body part 102, so that the attachment plate 101 can be restricted to move between the upper plate 233 and the lower plate 234.

Through the fastening of the fastener 401, the coil spring 903 as the second adjustment part 212 is limited and mounted above the upper plate 233 of the body part 102. The shank 602 of the bolt 305 sequentially runs through the interior of the sleeve 232 and the interior of the coil spring 903 from bottom to top, and the head 601 of the bolt 305 remains under the lower plate 234. In the second embodiment of the present disclosure, the coil spring 903 is disposed above the upper plate 233 of the body part 102. In other embodiments, the coil spring 903 may also be disposed below the lower plate 234 of the body part 102.

A distal end of the shank 602 of the bolt 305 extends out of the top end of the coil spring 903 by a length, and a certain accommodating space 502 can also be reserved between the nut 306 and the coil spring 903 even if the nut 306 is completely assembled to the distal end of the shank 602 of the bolt 305. The accommodating space 502 between the nut 306 and the coil spring 903 can be used to accommodate a first mounting piece to be fixed. For simplicity of illustration, the first mounting piece is not shown in FIGS. 11A and 11B. The first mounting piece is provided with an insertion hole through which the shank 602 of the bolt 305 can pass, so that the first mounting piece is fixed between the nut 306 and the coil spring 903. That is, through the fastener 401 of the connector assembly 400, the connector assembly 400 can be connected to the first mounting piece to be fixed. Similar to the first embodiment of the present disclosure, in the second embodiment, the first mounting piece to be fixed is a fixed mounting plate on an automobile, so that the connector assembly 400 can provide a mounting structure floatable in three dimensions of X-axis, Y-axis and Z-axis for components and parts on the automobile.

A user may connect the connector assembly 400 of the second embodiment to the first mounting piece to be fixed by the following steps: First, the sleeve 232 of the body part 102 is inserted into the tubular portion 902 of the first adjustment part 211 from above the attachment plate 101 where the first adjustment part 211 is injection molded. At this time, the upper plate 233 integrally connected to the sleeve 232 abuts against the top of the first adjustment part 211. Next, the lower plate 234 is mounted to the bottom end of the sleeve 232 so that the lower plate 234 abuts against the bottom of the first adjustment part 211. Then, the shank 602 of the bolt 305 is sequentially inserted into the sleeve 232 and the coil spring 903 from below the lower plate 234 such that the coil spring 903 is mounted above the upper plate 102. At this time, the head 601 of the bolt 305 remains under the lower plate 234. Subsequently, the distal end of the shank 602 of the bolt 305 passes through the insertion hole in the first mounting piece and extends out of a lower surface of the first mounting piece. Finally, the nut 306 is securely mounted to the distal end of the shank 602 of the bolt 305 from above the first mounting piece, such that the lower surface of the nut 306 abuts against the upper surface of the first mounting piece. In this way, the connector assembly 400 of the second embodiment can be fixed to the first mounting piece to be fixed (i.e., the fixed mounting plate of the automobile).

In the second embodiment of the present disclosure, the coil spring 903 is mounted above the upper plate 233, so that the first mounting piece to be fixed is connected between the upper plate 233 and the nut 306. In other embodiments, when the coil spring 903 is mounted below the lower plate 234, the first mounting piece to be fixed may also be connected between the lower plate 234 and the head 601 of the shank 305.

Similar to the structure of the first embodiment of the present disclosure shown in FIG. 7 where two floating connectors 100 are in cooperative use, it is also possible to cooperatively use two connector assemblies 400 of the second embodiment of the present disclosure that share one attachment plate 101, to provide the attachment plate 101 with floating adjustment in the XYZ three-dimensional directions. In an embodiment in which two floating connectors 100 are cooperatively used to provide the attachment plate 101 with three-dimensional floating adjustment, a mounting hole 701 may also be provided in the attachment plate 101 for connecting a second mounting piece to be fixed. In some embodiment, the second mounting piece is a female fitting of quick-connect fittings for an automobile pipeline. When the female fitting is mounted on the attachment plate 101, the female fitting can float in the XYZ three-dimensional directions relative to the first mounting piece (e.g., the fixed mounting plate of the automobile), so that a male fitting and the female fitting can also be quickly and effectively connected together even if the male fitting has a certain positional deviation relative to the female fitting in the process of inserting the male fitting into the female fitting.

Unlike the connector assembly 400 of the first embodiment of the present disclosure, in which the first adjustment part 211 and the second adjustment part 212 are integrally formed, the connector assembly 400 of the second embodiment of the present disclosure disposes the first adjustment part 211 separately from the second adjustment part 212. The separate structural arrangement of the first adjustment part 211 and the second adjustment part 212 can facilitate the user to select the first adjustment part 211 and the second adjustment part 212 of different materials and structures according to requirements, which helps to meet the requirements for the floating amount of the attachment plate 101 in the plane defined by the X axis and the Y axis and the floating amount in the Z-axis direction.

The floating connector and the connector assembly of the embodiments of the present disclosure use rubber as a material for providing the floating adjustment movement (e.g., for the first adjustment part 211, or for the first adjustment part 211 and the second adjustment part 212). Since the internal damping of rubber is much larger than that of metal, the floating connector and the connector assembly of the present disclosure have less excitation transmission during resonance, and can achieve better vibration isolation performance and vibration damping effect. In addition, compared with the spring formed by a metal material, the first adjustment part 211 and the second adjustment part 212 formed by a rubber material are less restricted in terms of shape, and a manufacturer can adjust the rigidities in three directions according to the design requirements. The resultant floating connector and the connector assembly have large variation ranges of rigidities, thereby achieving a controllable floating amount in a larger range. In the present disclosure, rubber is used to prepare the first adjustment part 211, or the first adjustment part 211 and the second adjustment part 212, which are integrally formed with the surrounding attachment plate 101 through a rubber member (for example, the first adjustment part 211 is integrally formed with the plastic attachment plate 101 through a secondary injection molding process), so that the assembly process for assembling the first adjustment part 211 to the attachment plate 101 is omitted, and the assembly steps for assembling the floating connector to the connector assembly are simplified.

Although the present disclosure is described with reference to the specific embodiments shown in the accompanying drawings, it should be understood that the floating connector of the present disclosure can have many variations without departing from the spirit and scope of the teaching of the present disclosure. Those of ordinary skill in the art would also have appreciated that there are different ways to alter the structural details in the embodiments disclosed in the present disclosure, which all fall within the spirit and scope of the present disclosure and the claims.

Various features and advantages of the invention are set forth in the following claims.

We claim:
1. A floating connector, comprising:
a body part comprising an upper plate, a lower plate, and a sleeve disposed between the upper plate and the lower plate;
an attachment plate having a connection hole therein, wherein the attachment plate is jacketed outside the sleeve through the connection hole and is located between the upper plate and the lower plate of the body part, and wherein the inner diameter of the connection hole is larger than the outer diameter of the sleeve so that an assembly space is formed between an inner wall of the connection hole and an outer wall of the sleeve;

a first adjustment part located in the assembly space, wherein the first adjustment part comprises an annular portion, the annular portion has an inner edge, an outer edge and a first foldable portion located between the inner edge and the outer edge, and the outer edge is connected to the inner wall of the connection hole; and a second adjustment part comprising a tubular body, the tubular body being jacketed outside the sleeve and having a second foldable portion, wherein the first adjustment part is arranged around the tubular body of the second adjustment part, and the inner edge of the first adjustment part extends from an outer wall of the tubular body and is integrated with the outer wall of the tubular body, and wherein the attachment plate includes a thickness H that is greater than a thickness of the first adjustment part.

2. The floating connector of claim 1, wherein the first adjustment part is capable of deforming elastically through the first foldable portion, so that the first adjustment part provides horizontal movement of the attachment plate relative to the body part; and the second adjustment part is capable of deforming elastically through the second foldable portion, so that the second adjustment part provides vertical movement of the attachment plate relative to the body part.

3. The floating connector of claim 2, wherein the first adjustment part and the second adjustment part are integrally formed by rubber, and the attachment plate is formed by plastic.

4. The floating connector of claim 1, wherein the distance between the upper plate and the lower plate of the body part is greater than the thickness H of the attachment plate, such that the attachment plate is movable between the upper plate and the lower plate.

5. The floating connector of claim 1, wherein the lower plate of the body part is integrally formed with the sleeve, and the upper plate is fastened to the sleeve.

6. The connector assembly of claim 1, further including a fastener capable of connecting the floating connector to a first mount piece to be fixed through the sleeve of the floating connector.

7. The connector assembly of claim 6, wherein the fastener comprises a shank, a head provided at one end of the shank, and a nut connected to the other end of the shank, the shank is capable of being mounted in the sleeve, and the first mount piece to be fixed is connected between the upper plate/lower plate and the nut/head.

8. The connector assembly of claim 7, wherein the attachment plate of the floating connector is provided with a mounting hole for connecting a second mount piece to be fixed.

* * * * *